(12) United States Patent
Fox et al.

(10) Patent No.: US 11,327,456 B2
(45) Date of Patent: May 10, 2022

(54) EFFICIENT CONTROLLER DATA GENERATION AND EXTRACTION

(71) Applicant: Aurora Labs Ltd., Tel Aviv (IL)

(72) Inventors: Zohar Fox, Tel Aviv-Yaffo (IL); Oren Sokoler, Rehovat (IL); Kfir Ben Shimon, Kiryat Ono (IL)

(73) Assignee: Aurora Labs Ltd., Tel Aviv (IL)

( * ) Notice: Subject to any disclaimer, the term of this patent is extended or adjusted under 35 U.S.C. 154(b) by 0 days.

(21) Appl. No.: 17/361,081

(22) Filed: Jun. 28, 2021

(65) Prior Publication Data
US 2021/0405604 A1 Dec. 30, 2021

Related U.S. Application Data

(60) Provisional application No. 62/705,484, filed on Jun. 30, 2020, provisional application No. 63/045,732, filed on Jun. 29, 2020.

(51) Int. Cl.
*G05B 19/042* (2006.01)
*G06F 16/21* (2019.01)

(52) U.S. Cl.
CPC ....... *G05B 19/0426* (2013.01); *G06F 16/219* (2019.01); *G05B 2219/23301* (2013.01)

(58) Field of Classification Search
CPC ...... G05B 19/0426; G05B 2219/23301; G06F 16/219
See application file for complete search history.

(56) References Cited

U.S. PATENT DOCUMENTS

| | | | |
|---|---|---|---|
| 2005/0234997 A1* | 10/2005 | Gu | G06F 16/10 |
| 2008/0040401 A1* | 2/2008 | Reinsch | G06F 8/658 |
| 2013/0212161 A1* | 8/2013 | Ben-Shaul | G06F 16/178 709/203 |
| 2013/0246709 A1* | 9/2013 | Segelken | G06F 12/0875 711/125 |
| 2014/0050419 A1* | 2/2014 | Lerios | G06T 3/0056 382/276 |
| 2018/0314726 A1* | 11/2018 | Bath | G06F 16/27 |
| 2019/0391800 A1* | 12/2019 | Lin | H04L 67/34 |
| 2020/0348662 A1* | 11/2020 | Cella | G05B 23/024 |

* cited by examiner

*Primary Examiner* — Ziaul Karim
(74) *Attorney, Agent, or Firm* — Finnegan, Henderson, Farabow, Garrett & Dunner, LLP

(57) ABSTRACT

Disclosed herein are techniques for efficiently providing controller data as part of a maintenance or update process. Techniques include receiving, from a first remote computing device, a message associated with at least one controller; extracting, based on the received message, an image of software associated with the at least one controller; accessing, based on the extracted image, a delta file; and transmitting the accessed delta file to a second remote computing device.

17 Claims, 6 Drawing Sheets

EFFICIENT CONTROLLER DATA GENERATION AND EXTRACTION

CROSS-REFERENCE TO RELATED APPLICATIONS

This application claims priority to U.S. Provisional Patent App. No. 63/045,732, filed on Jun. 29, 2020, and U.S. Provisional Patent Application No. 62/705,484, filed on Jun. 30, 2020. The disclosures of the aforementioned applications are expressly incorporated herein by reference in their entireties.

U.S. application Ser. No. 16/044,002, filed on Jul. 24, 2018, claims priority to U.S. Provisional Patent App. No. 62/536,767, filed on Jul. 25, 2017, and U.S. Provisional Patent App. No. 62/560,224, filed on Sep. 19, 2017; and U.S. application Ser. No. 16/828,770, filed on Mar. 24, 2020, claims priority to U.S. Provisional Patent App. No. 62/823,131, filed on Mar. 25, 2019. Each of these foregoing applications are also incorporated by reference in their entireties.

TECHNICAL FIELD

The subject matter described herein generally relates to providing software analysis and software changes to Internet-of-Things (IoT) or network-connected systems, as well as to various other types of systems that utilize controllers such as electronic control units (ECUs) or other IoT controllers. For example, certain disclosed embodiments are directed to efficiently providing automotive ECU data as part of a maintenance or update process.

BACKGROUND

Modern vehicles and other systems often support a number of controllers, such as ECUs, or other devices. These components may host software that is updated from time to time. In some cases, a component may be unconnected from a system and stored for a long period of time, such that it retains an outdated version of software. For example, an ECU designated for replacing another ECU damaged in an automobile accident may sit dormant on a shelf in an auto repair facility for many months, or even years, before being used for replacement, at which point it may have outdated software, which may lack system operation safety features or may have malware vulnerabilities. Of course, the same risks may exist for non-automotive replacement components as well.

Existing techniques for installing up-to-date software on a controller often involve downloading and installing a new version of software using an entire software image of an updated version of software. In many cases, these images are downloaded directly from a software originator, such as an Original Equipment Manufacturer (OEM), which may have a limited upload bandwidth for downloading the image. Moreover, downloading the entire image can use considerable bandwidth and processing resources, which can limit the ability of a downloading device, such as a computer connected to a controller, to perform other functions.

Not only does use of an entire software image delay software update processes at the point of download, but it can also delay software updates at the point of install, such as installing software onto a controller or installing a controller into a system. For example, it may take considerable time for a controller to download and install a software update from a full image. In some cases, a controller may not have sufficient memory space for the software update, and may have to perform significant changes to memory to make space for the update. In some scenarios, a controller may have software that is out-of-date with respect to multiple versions of software. This may result in a need to download and install multiple images, further compounding all of the problems discussed above. Moreover, current techniques may involve cumbersome combinations of devices, connections, and communications, such as a modem, dongle, and/or on-board diagnostic (OBD) communications, which may further delay software updates.

In view of the technical deficiencies of current systems, there is a need for improved systems and methods for providing comprehensive software changes for controllers. The techniques discussed below offer many technological improvements in reliability, efficiency, speed, and usability. For example, according to some techniques, a delta file may be accessed based on an image, and the delta file may be provided to a controller. Also, multiple delta files based on different initial and final images may be maintained and provided to controllers according to update criteria.

SUMMARY

Some disclosed embodiments describe non-transitory computer readable media, systems, and methods for efficiently providing controller data. For example, in an exemplary embodiment, a non-transitory computer readable medium may include instructions that, when executed by at least one processor, cause the at least one processor to perform operations for efficiently providing controller data as part of a maintenance or update process. The operations may comprise receiving, from a first remote computing device, a message associated with at least one controller; extracting, based on the received message, an image of software associated with the at least one controller; accessing, based on the extracted image, a delta file; and transmitting the accessed delta file to a second remote computing device.

In accordance with further embodiments, the transmitted delta file is configured for a program to construct an image file based on the transmitted delta file.

In accordance with further embodiments, the constructed image is configured for being flashed over a communication bus in a vehicle.

In accordance with further embodiments, the message is transmitted from the first remote computing device based on the first remote computing device determining that two software version identifiers are different, and the image of software is associated with one of the software version identifiers.

In accordance with further embodiments, the image is a binary image.

In accordance with further embodiments, the at least one controller is an electronic control unit (ECU).

In accordance with further embodiments, the operations further comprise storing the extracted image in a database.

In accordance with further embodiments, the stored extracted image is a most recently stored image of software for a controller identifier of the at least one controller.

In accordance with further embodiments, the received message comprises a controller identifier and storing the extracted image in the database comprises storing the extracted image with previously extracted images associated with the controller identifier.

In accordance with further embodiments, the extracted image and the previously extracted images are associated with respective vehicle identification numbers (VINs).

In accordance with further embodiments, the delta file represents differences between the extracted image of software and a stored image of software in a database.

In accordance with further embodiments, the delta file is multidimensional.

In accordance with further embodiments, accessing the delta file comprises generating the delta file.

In accordance with further embodiments, generating the delta file comprises: comparing the extracted image of software to a stored image of software in a database and based on the comparison, determining differences between the extracted image of software and the stored image of software, the delta file representing the differences.

In accordance with further embodiments, the operations further comprise determining the stored image of software based on a controller identifier included in the received message.

In accordance with further embodiments, the stored image of software is a most recently stored image of software for the controller identifier.

In accordance with further embodiments, the operations further comprise compressing the delta file prior to sending it to the second computing device.

In accordance with further embodiments, the image is a first image and the second computing device includes client software configured to build a second image based on the transmitted delta file.

In accordance with further embodiments, the delta file is transmitted in response to determining damage to a system.

Yet another embodiment may include a method for efficiently providing controller data as part of a maintenance or update process. The method may comprise steps of: receiving, from a first remote computing device, a message associated with at least one controller; extracting, based on the received message, an image of software associated with the at least one controller; accessing, based on the extracted image, a delta file; and transmitting the accessed delta file to a second remote computing device.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1A:
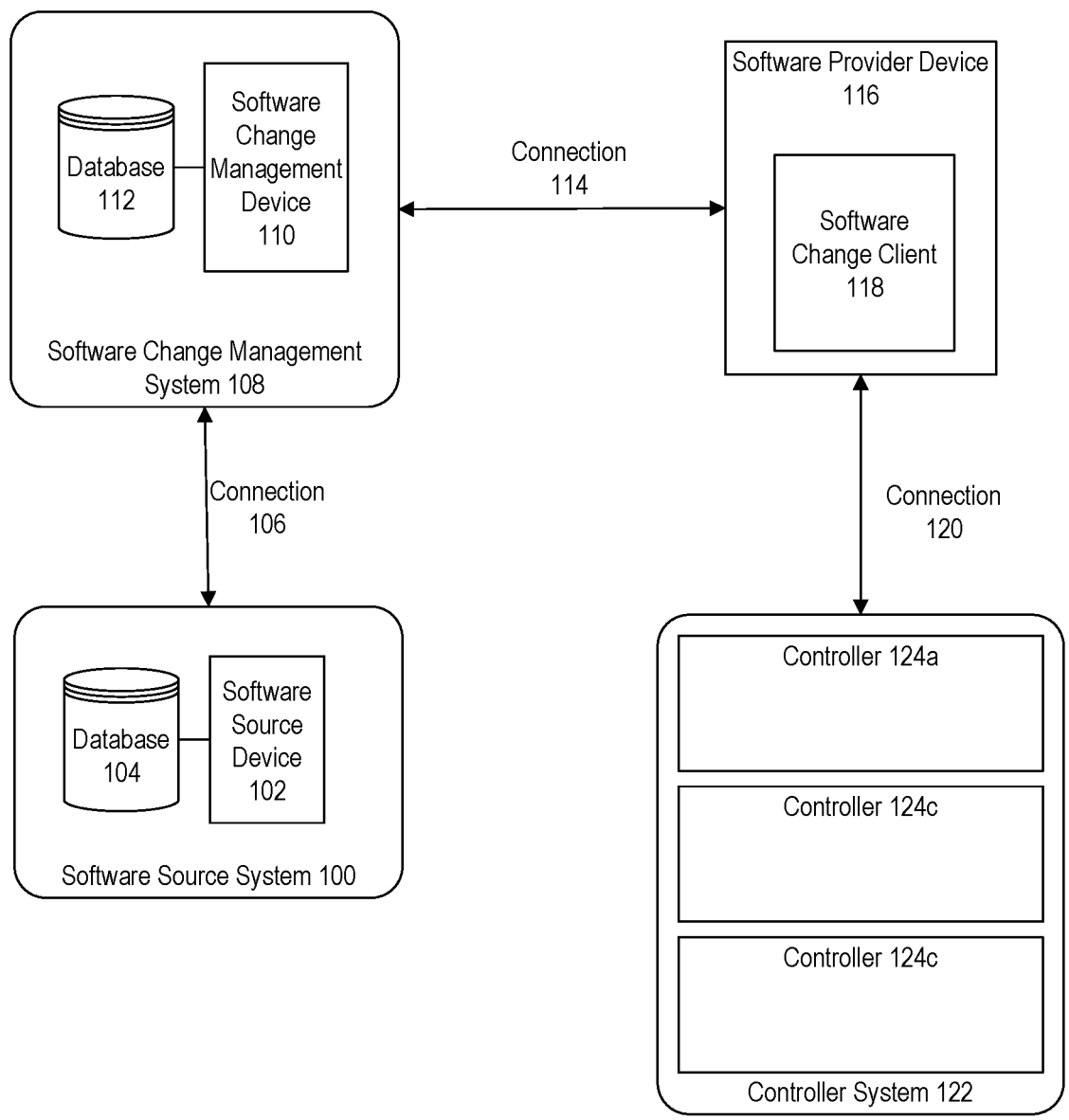
FIG. 1A depicts an exemplary pictographic representation of a network architecture for controller data, consistent with embodiments of the present disclosure.

FIG. 1A shows network architecture 10, which may include multiple systems and/or devices connected by a combination of wired and/or wireless connections (discussed further below). While a number of exemplary connections are shown between devices and/or systems in FIG. 1A, it is appreciated that other combinations of connections between any devices and/or systems may exist. For example, network architecture 10 may include a software source system 100. Software source system 100 may be maintained by a security provider, software developer, Original Equipment Manufacturer (OEM), any other entity associated with improving computer software, or any combination of these entities. Software source system 100 may include a software source device 102, which may be a single device or combination of devices. Software source device 102 may be a processing device 150, discussed further below. In some embodiments, software source device 102 may generate and/or transmit a software image (e.g., software for an IoT device, automotive ECU, etc.). Software source device 102 may also generate a prompt, which may be a prompt to another device or system to perform a software update, access an update file, transmit an update file, generate an update file, or perform any operation discussed herein. A prompt may include installation instructions, a software image, a binary file, and/or other file representing a change to code (e.g., controller code). Software source system 100 may also include a database 104, which may store one or more software images, binary code, compiled code, uncompiled code, an instruction set, routing information, a signature (e.g., software signature), data used for generating and/or transmitting a software image, and/or any data to be used in methods of the disclosed embodiments, as discussed further below. Database 104 may be a relational database (e.g., Structured Query Language, or SQL, database) database, a non-relational database, an object-oriented database, a text database, a centralized database, a distributed database, a hierarchical database, or in any other configuration suitable for storing data. Database 104 may include any number of disk drives, servers, server arrays, server blades, memories, or any other medium capable of storing data. While database 104 is shown within software source system 100, it may also exist externally to it, such as at a remote cloud computing platform.

Software source system 100 may be communicably connected by connection 106 to software change management system 108 and/or any other device or system. A connection may be a communication channel, which may include a bus, a cable (e.g., fiber optic cable, co-axial cable, ethernet cable, Universal Serial Bus (USB) cable, etc.), a wireless (e.g., over-the-air or OTA) communication channel, a radio-based communication channel, a local area network (LAN), the Internet, a wireless local area network (WLAN), a wide area network (WAN), a cellular communication network, any Internet Protocol (IP) based communication network, the like, and/or any combination thereof.

Software change management system 108 may be associated with performing operations based on a software image. For example, software change management system 108 may be associated with generating delta files, verifying delta files, and/or performing other operations associated with changing or securing controller software. In some embodiments, software change management system 108 may include a software change management device 110, which may perform operations associated with a software image and/or delta file (e.g., steps of process 400), such as accessing or transmitting a delta file. Software change management device 110 may be a processing device 150, discussed further below. Software change management system 108 may also include database 112, which may be any of the databases described above with respect to database 104.

Database 112 may store at least one software image, at least one delta file, and/or any data to be used in methods of the disclosed embodiments, as discussed further below. In some embodiments, database 112 may store metadata associated with a software image and/or delta file, such as a software image identifier, a delta file identifier, a version identifier, a controller identifier (e.g., controller model number, controller serial number, etc.), a device identifier (e.g., device model number, device serial number, etc.), a system identifier (e.g., a system model number, system manufacture date, a vehicle make, a vehicle model, a vehicle identification number, or VIN, etc.), a date (e.g., a software release date), a timestamp, a software source identifier (e.g., OEM name), a file format, the like, and/or any combination thereof. In some embodiments, database 112 may associate a delta file with one or more software images. For example, database 112 may associate (e.g., using a data structure) a delta file with either or both of an initial software image (e.g., representing a first version of software) and a subsequent software image (e.g., representing a second version of software). In some embodiments, software change management device 110 and/or database 112 may store software images and/or delta files associated with different origins (e.g., OEMs), which may be organized in a virtual library, look-up table, or other data structure to allow for accurate access. In some embodiments, software change management device 110 and/or database 112 may access a delta file based on a first version of software (e.g., identified as a current version of software on a controller by a communication received from software provider device 116 or controller system 122) and a second version of software (e.g., identified by a communication received from software provider device 116 or controller system 122, as a desired version of software for a controller). Software change management system 108 may be communicably connected by connection 114 to software provider device 116 and/or any other device or system. Connection 114 may be any connection described above with respect to connection 106.

Software provider device 116 may be associated with providing a software change (e.g., update, rollback, patch, fix, etc.) to a controller or other device. In some embodiments, software provider device 116 may be a personal computer or other personal computing device which may connect to and transmit an update to a controller. For example, software provider device 116 may be hosted by a controller repair business, automobile repair business, IoT service provider, or other entity associated with providing software changes (e.g., updates) to a controller. Software provider device 116 may be a processing device 150, discussed further below. In some embodiments, software provider device 116 may host a software change client 118, which may have been received (e.g., downloaded from) software change management system 108. For example, software change client 118 may be a program 132. In some embodiments, software change client 118 may be an application or other piece of software configured with instructions to cause a processor (e.g., processor 158) to perform operations associated with effecting a software change to a controller, such as receiving a delta file, parsing a delta file, identifying a controller associated with a delta file, extracting a delta from a delta file, decompressing a delta or delta file, constructing an image, transmitting (e.g., flashing) an image, transmitting (e.g., flashing) a delta or delta file, or performing any step in the methods discussed herein. Software provider device 116 may be communicably connected by connection 120 to controller system 122 and/or any other device or system. Connection 120 may be any connection described above with respect to connection 106.

A controller system 122 may be, for example, a home security system, a parking garage sensor system, a vehicle, an inventory monitoring system, a number of connected appliances, telephony equipment, a group of network routing devices, a smart power grid system, a drone or other unmanned vehicle, a hospital monitoring system, and/or any other Internet of Things (IoT) system. A controller system may include controllers arranged in a local area network (LAN), a wide area network (WAN), or any other communications network arrangement. Further, each controller system may include any number of controllers. For example, exemplary controller system 122 includes controllers 124a, 124b, and 124c, which may have the same or different functionalities or purposes. In some embodiments, one or more controllers in controller system 122 may be identified as damaged, malfunctioning, having outdated software (e.g., software not having a predefined version number or release date, not having a version number or release date meeting a threshold, etc.), or be otherwise underequipped to perform according to an operation criterion (e.g., processing speed). Additionally or alternatively, one or more controllers in controller system 122 may be identified as functioning in accordance with at least one operation criterion (e.g., having software of a particular version). These controllers are discussed further through the description of exemplary controller 124a, discussed with respect to FIG. 1B. In some embodiments, controller system 122 may include a Controller Area Network (CAN) bus, which may allow for communication between controllers (e.g., controller 124b and controller 124c), between controller system 122 and other devices or systems (e.g., software provider device 116), and/or between a controller and a device or system (e.g., software change management system 108). Communications within, to, or from a controller and/or controller system 122 may be formatted according to a particular protocol, such as Unified Diagnostic Services (UDS).

Figure 1B:
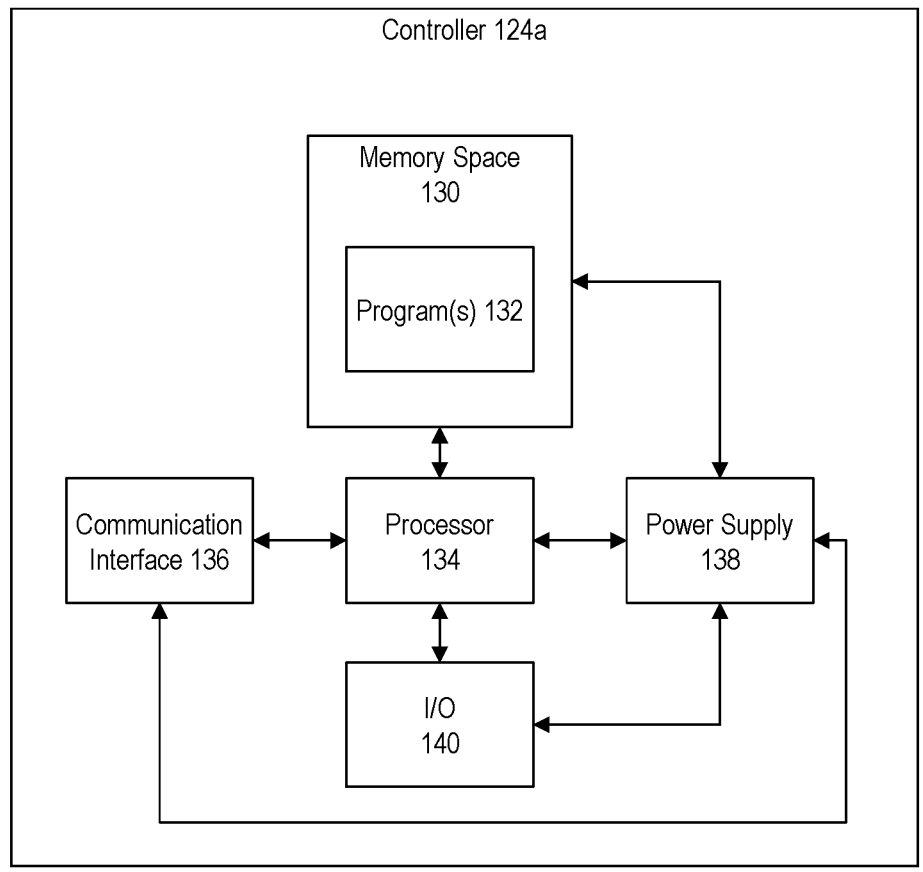
FIG. 1B depicts an exemplary pictographic representation of a controller, consistent with embodiments of the present disclosure.

FIG. 1B shows exemplary controller 124a, which may be an automotive controller, such as an electronic control unit (ECU) (e.g., manufactured by companies such as Bosch™, Delphi Electronics™, Continental™, Denso™, etc.), or may be a non-automotive controller, such as an IoT controller manufactured by Skyworks™, Qorvo™, Qualcomm™, NXP Semiconductors™, etc. Controller 124a may be configured to perform a single function (e.g., a braking function in a vehicle), or multiple functions. Controller 124a may perform any number of steps of the exemplary processes discussed herein, consistent with the disclosed exemplary embodiments.

Controller 124a may include a memory space 130 and a processor 134. Memory space 130 may be a single memory component, multiple memory components, and/or a portion (e.g., partition) of a memory component. Such memory components may include an electronic storage device, a magnetic storage device, an optical storage device, an electromagnetic storage device, a semiconductor storage device, or any suitable combination of the foregoing. For example, memory space 130 may include any number of hard disks, random access memories (RAMs), read-only memories (ROMs), erasable programmable read-only memories (EPROMs or Flash memories), and the like. Memory space 130 may include one or more storage devices configured to store instructions usable by processor 134 to perform functions related to the disclosed embodiments. For example, memory space 130 may be configured with one or more software instructions, such as software program(s) 132 or code segments that perform one or more operations when executed by processor 134 (e.g., the operations discussed in connection with figures below). The disclosed embodiments are not limited to separate programs or computers configured to perform dedicated tasks. For example, memory space 130 may include a single program or multiple programs that perform at least one function of controller system 122. Memory space 130 may also store data that is used by one or more software programs (e.g., data relating to controller functions, data obtained during operation of a controller system, such as a vehicle, or other data).

In certain embodiments, memory space 130 may store software executable by processor 134 to perform one or more methods, such as the methods discussed below. The software may be implemented via a variety of programming techniques and languages, such as C or MISRA-C, ASCET, Simulink, Stateflow, and various others. Further, it should be emphasized that techniques disclosed herein are not limited to automotive embodiments. Various other IoT environments may use the disclosed techniques, such as smart home appliances, network security or surveillance equipment, smart utility meters, connected sensor devices, parking garage sensors, and many more. In such embodiments, memory space 130 may store software based on a variety of programming techniques and languages such as C, C++, PHP, Java, JavaScript, Python, and various others.

Processor 134 may include one or more dedicated processing units, application-specific integrated circuits (ASICs), field-programmable gate arrays (FPGAs), graphical processing units, or various other types of processors or processing units coupled with memory space 130. Processor 134 may include a special-purpose processor, general-purpose processor, physical processor, and/or virtual processor.

Controller 124a may also include a communication interface 136, which may allow for remote devices to interact with controller 124a. Communication interface 136 may include an antenna, transceiver, or wired connection to allow for communication to or from controller 124a. For example, an external device (such as controller 124b, controller 124c, software provider device 116, software change management system 108, or any other device capable of communicating with controller 124a) may send code to controller 124a instructing controller 124a to perform certain operations, such as changing software stored in memory space 130.

Controller 124a may also include power supply 138, which may be a battery internal to a physical housing of controller 124a, and which may provide electrical power to controller 124a to allow its components to function. In some embodiments, a power supply 138 may exist external to a physical housing of a controller (i.e., may not be included as part of controller 124a itself), and may supply electrical power to multiple controllers (e.g., all controllers within controller system 122).

Controller 124a may also include an input/output device (I/O) 140, which may be configured to allow for a user or device to interact with controller 124a. For example, I/O 140 may include at least one of wired and/or wireless network cards/chip sets (e.g., Wi-Fi-based, cellular based, etc.), an antenna, a display (e.g., graphical display, textual display, etc.), an LED, a router, a touchscreen, a keyboard, a microphone, a speaker, a haptic device, a camera, a button, a dial, a switch, a knob, a transceiver, an input device, an output device, or another I/O device configured to perform, or to allow a user to perform, any number of steps of the methods of the disclosed embodiments, as discussed further below.

Figure 1C:
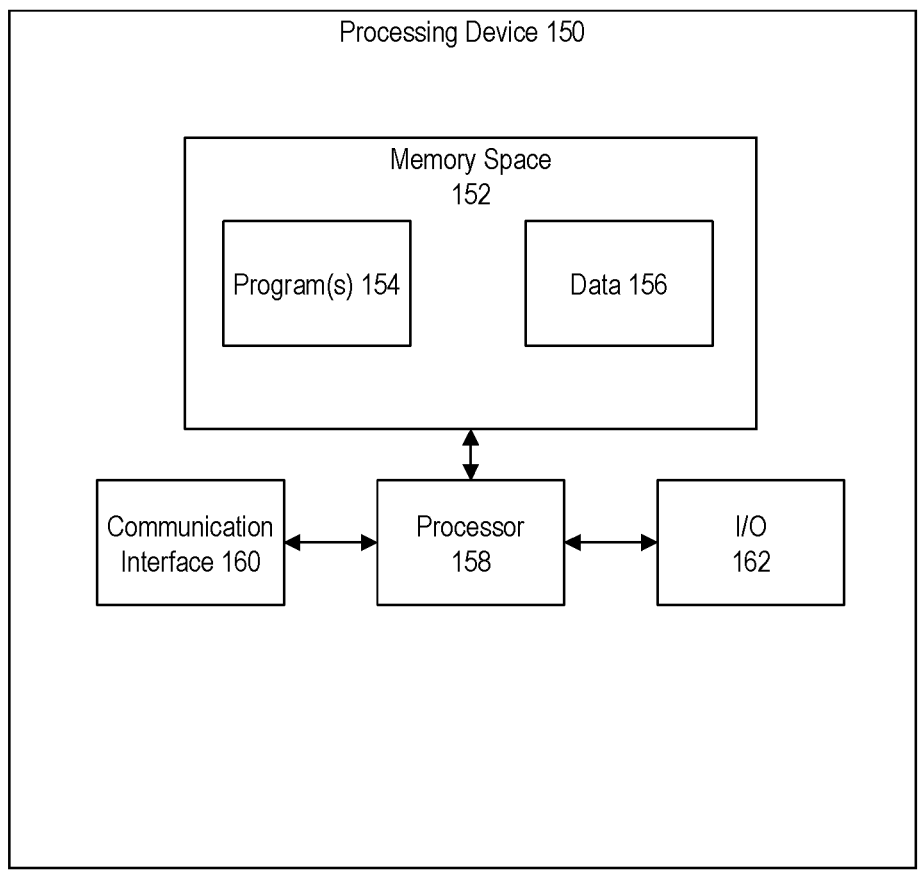
FIG. 1C depicts an exemplary pictographic representation of a processing device, consistent with embodiments of the present disclosure.

FIG. 1C shows an exemplary processing device 150, which may be a single device or multiple devices. In some embodiments, processing device 150 may be a computer, server, mobile device, special purpose computer, or any other computing device that may allow a user to perform any number of steps of the methods of the disclosed embodiments, as discussed further below. Processing device 150 may also connect to a database, such as database 104 and/or database 112, as discussed above.

Processing device 150 may include a memory space 152, which may store software executable by processor 158 to perform one or more methods, such as the methods discussed below. Memory space 152 may include any of the aspects discussed above with respect to memory space 130. For example, memory space 152 may be configured with one or more software instructions, such as software program(s) 154 or code segments that perform one or more operations when executed by processor 158 (e.g., the operations discussed in connection with figures below). Memory space 152 may also include data 156, which may include controller operation data (e.g., data describing controller operations performed over a period of time, controller resource usage, error reports, etc.), controller identification information, controller system identifier information, etc. Data 156 may include data received from a controller and/or data input by a user (e.g., a technician facilitating maintenance operations to a controller).

As discussed above, processing device 150 may include a processor 158, which may include one or more dedicated processing units, application-specific integrated circuits (ASICs), field-programmable gate arrays (FPGAs), graphical processing units, or various other types of processors or processing units coupled to memory space 152. In some embodiments, processor 158 may be or include a virtual computing resource (e.g., virtual machine, container, hypervisor, etc.), which may be spun up and/or spun down according to processing demands and/or capabilities of a host device (e.g., processing device 150). Processor 158 may also include any aspect described above with respect to processor 134.

Processing device 150 may also include a communication interface 160, which may allow a first processing device 150 (e.g., software change management device 110) to communicate with a second processing device 150 (e.g., software provider device 116), which may be part of a separate system, relative to the first processing device 150. Communication interface 160 may include an antenna, transceiver, or wired connection to allow for communication to or from a processing device 150. Communication interface 160 may include any aspect described above with respect to communication interface 136.

Processing device 150 may also include an input/output device (I/O) 162, which may be configured to allow for a user or device to interact with controller system 122, a controller (e.g., controller 124a), or any other device or component discussed with respect to network architecture 10. I/O 162 may include any aspect described above with respect to I/O 140. For example, I/O 162 may include a touchscreen, mouse, keyboard, or any other element of I/O 140 that may allow a user to interact with a processing device 150. In some embodiments, computing device 150 may be connected to a display, which may be considered part of I/O 140. A display may include a liquid crystal display (LCD), in-plane switching liquid crystal display (IPS-LCD), light-emitting diode (LED) display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. A display may display graphical interfaces, interactable graphical elements, animations, dynamic graphical elements, and any other visual element for aiding a user in changing software on a controller.

Figure 2:
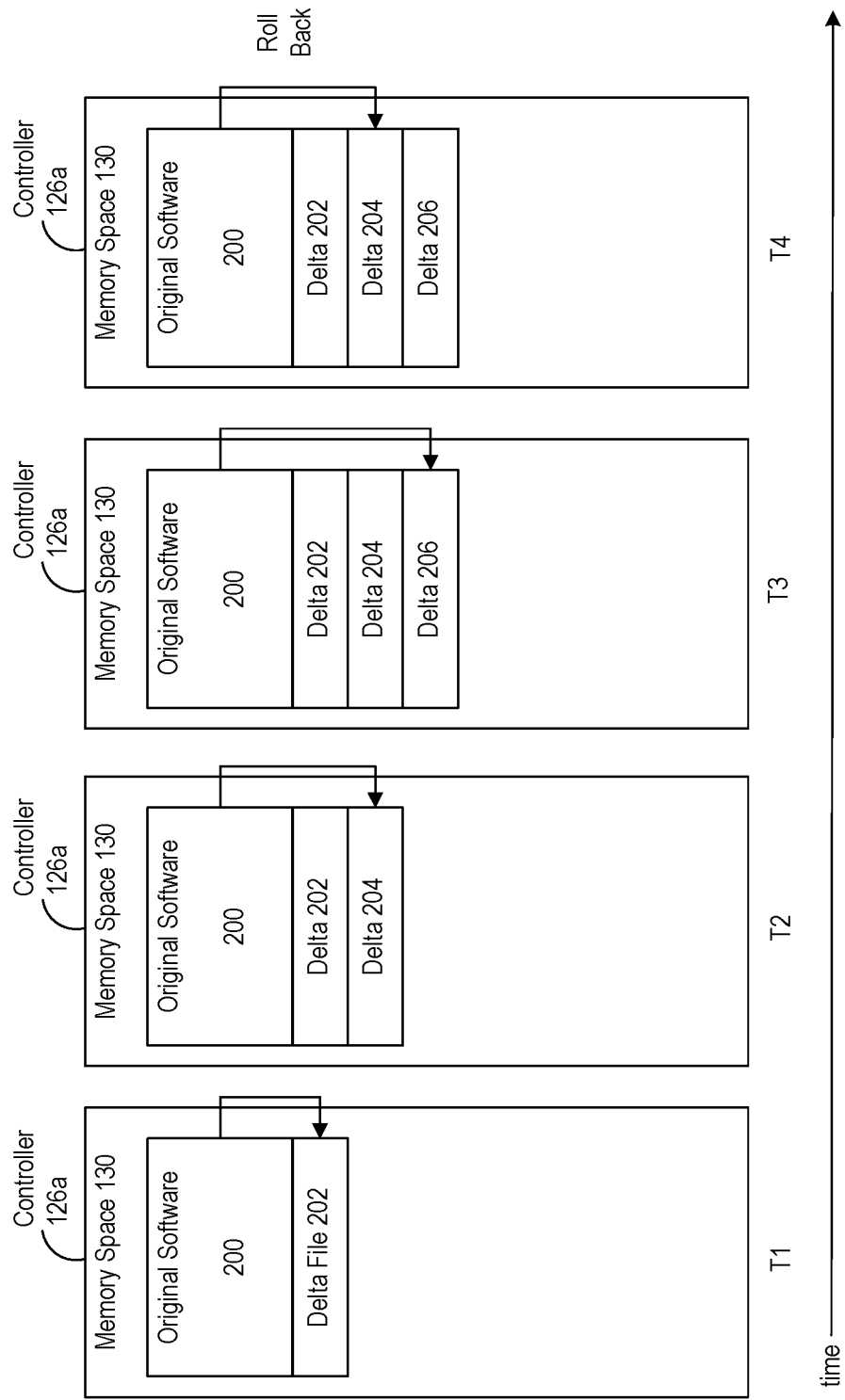
FIG. 2 illustrates an exemplary pictographic representation of delta file software changes on a controller, consistent with embodiments of the present disclosure.

FIG. 2 illustrates an exemplary pictographic representation of delta file software changes on controller 124a. Software on a controller (e.g., original software 200) may change over time, which may be accomplished through storing a delta (e.g., delta 202) in memory space 130. At different times, different deltas may be stored or removed from memory space 130, and/or different deltas may be currently implemented by software on controller 124a. For example, at a time T1, delta 202 may be stored in memory space 130, and may be currently implemented by original software 200 (as shown by an arrow in FIG. 2). At another point in time, T2, delta 204 (e.g., a software update, which may be part of a software management process, such as the process shown in FIG. 3) may be stored in memory space 130, and may be currently implemented by original software 200 (as shown by an arrow in FIG. 2). At yet another point in time, T3, delta 206 (e.g., another software update) may be stored in memory space 130, and may likewise be currently implemented by original software 200 (e.g., in addition to, or instead of, delta 204). At yet another point in time, T4, software on controller 124a may change from implementing delta 206 to implementing a previous delta 204 (e.g., a rollback).

In some embodiments, a delta (e.g., delta 204) may have been extracted from a delta file (such as by a software provider device 116, as discussed below). In some embodiments, a delta may instead be a delta file itself (e.g., with no extraction involved). In some embodiments, original software 200 and any combination of deltas or delta files (including none at all) may constitute a software image file. In other embodiments, original software 200 may constitute a software image file, and deltas (e.g., deltas 202 and 204) or delta files may constitute additional software image files stored on controller 124a in memory space 130. In some embodiments, a delta and/or delta file may be position-independent with respect to memory space 130 (or other memory component). For example, at time T3, delta 206 may be stored sequentially after (e.g., adjacent to) delta 204, or may be stored between deltas 202 and 204 (e.g., adjacent to delta 202 and delta 204).

Figure 3:
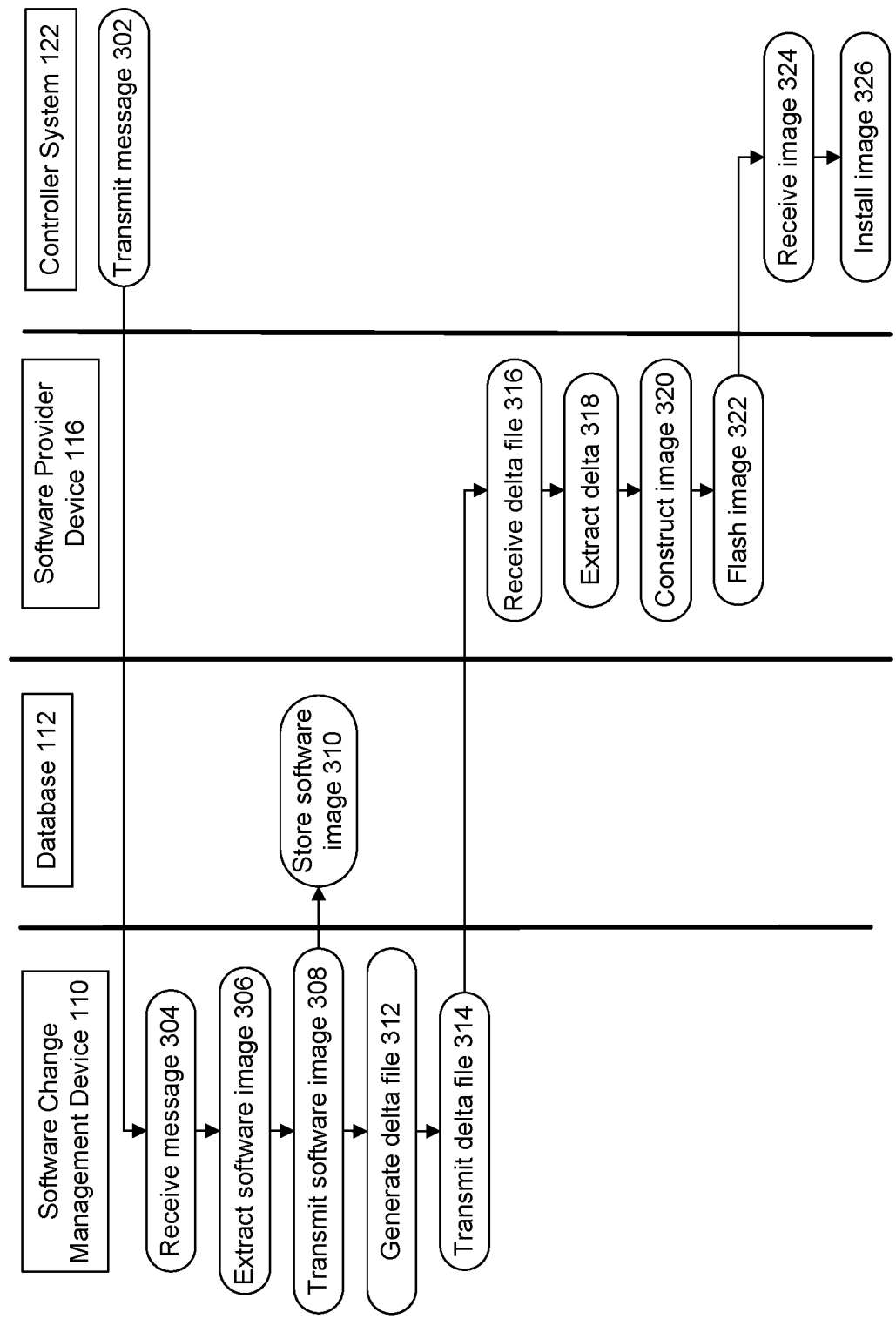
FIG. 3 is a flow diagram illustrating an exemplary delta file operation process, consistent with embodiments of the present disclosure.

FIG. 3 is a flow diagram illustrating an exemplary delta file operation process. Illustrative steps in the following discussion may be described with regard to the actions performed by a particular device and/or system, such as software source system 100, software change management device 110, database 112, software provider device 116, and controller system 122. However, one or more alternative devices may instead perform the disclosed function(s). For example, in some embodiments, a single device (e.g., a computing device 150) may perform operations described with respect to software source system 100 and software change management device 110. As another example, a controller (e.g., controller 124b) may perform operations described with respect to controller system 122. Additionally, while the steps in FIG. 3 are shown in a particular order and FIG. 3 is oriented to show time progressing downward, such that steps nearer to the top of the figure are performed earlier and steps horizontally parallel are performed substantially simultaneously, it is appreciated that the individual steps may be reordered, omitted, and/or repeated. Additional aspects related to the process shown in FIG. 3 are discussed further with respect to FIG. 4.

In some embodiments, at step 302, controller system 122 may transmit a message to another device, such as software change management device 110. In some embodiments, software provider device 116 may transmit the message to software change management device 110. In some embodiments, the message may be based on software provider device 116 scanning one or more controllers of controller system 122, or one or more replacement controllers, and determining one or more software images, software versions, or other software information. In some embodiments, software source system 100 may transmit the message. In some embodiments, the message may include instructions or information regarding a particular version of software for a device (e.g., a new version of software). Additionally or alternatively, the message may include software itself, such that another device may extract the software from the message. Software may include a line of code, an image, binary code, compiled code, uncompiled code, a multi-dimensional file, a delta file, a delta, an executable file, metadata, a configuration file, or the like, or any combination thereof. In some embodiments, software may be configured for installation and/or execution on a particular device, such as a controller. Moreover, software may also be configured for installation and/or execution on a particular type of device (e.g., controller of a particular model, controller manufactured during a particular time period, controller needing verification or certification, controller needing updating, controlled having received an update, controlled having a detected security risk, etc.).

At step 304, software change management device 110 may receive the message transmitted by controller system 122. As mentioned above, the message may also be received from software provider device 116, which may have transmitted the message in response to scanning at least part of controller system 122. In some embodiments, after receiving the message, software change management device 110 may verify an authenticity of the message and/or included software, such as by validating a signature associated with controller system 122 or software provider device 116 (e.g., a signature included in the message).

At step 306, software change management device 110 may extract a software image (or other form of software) from the message. In some embodiments, the software image may be designated for and/or configured for a particular device (e.g., configured for installation and/or execution on a controller). A software image may be expressed as a complete version or instance of software, a software image file, a matrix, or any other data structure describing a software state of at least a portion of software on a device and/or system.

At step 308, software change management device 110 may transmit the software image to another device (e.g., for storage), such as database 112. Additionally or alternatively, software change management device 110 may store the software image locally (e.g., in memory space 152).

At step 310, database 112 may store the software image. Database 112 may also associate a software image with particular metadata, such as a version number, file format, original source identifier (e.g., OEM identifier), intermediate source identifier (e.g., software provider device identifier), device identifier, system identifier, date (e.g., release date), and the like. Database 112 may periodically receive software images from various controller systems 122 and/or software provider devices 116, which may be located remotely from each other. In this manner, software change management device 110 and/or database 112 may gather versions of software (e.g., controller software) over time and provide corresponding delta files or other software to devices that lack and/or request a particular version, without needing to obtain an image file directly from a software source system 100 (e.g., OEM system), which may have slow upload speeds for sending image files, or suffer from other drawbacks. By way of example and without limitation, steps 302-310 (or any combination of steps of the process in FIG. 3) may be performed periodically, to regularly detect, store, and maintain software images, which may be used for future software changes (e.g., updates).

At step 312, software change management device 110 may generate a delta file. Additionally or alternatively to generating a delta file, software change management device 110 may access a delta file. As discussed further below, a delta file may be configured to change software on a device, such as a controller. A delta file may include one or more deltas, which may represent differences between two versions of code. A delta file may also include instructions, initialization code, bootstrapper code, and/or any other code configured to effect one or more deltas to a device (e.g., a controller).

At step 314, software change management device 110 may transmit the delta file to another device, such as software provider device 116, which may be a different software provider device 116 from which the message was received at step 304. In some embodiments, software change management device 110 may transmit the delta file in response to a request (e.g., a request from software provider device 116). Additionally or alternatively, software change management device 110 may transmit a delta file periodically (e.g., automatically, without intervention).

At step 316, software provider device 116 may receive the delta file. In some embodiments, software provider device 116 may be equipped with a particular application (or other form of software) that enables it to receive the delta file from software change management device 110 and/or perform other operations, such as those discussed below. In some embodiments, after receiving the delta file, software provider device 116 may verify an authenticity of the delta file, such as by validating a signature associated with software change management device 110 and/or a software source system 100 (e.g., a signature received with the delta file). In some embodiments, a signature may have been generated based on a computerized model that models code associated with the delta file.

At step 318, software provider device 116 may extract one or more deltas from the delta file. In some embodiments, software provider device 116 may determine a file format of the delta file and parse the delta file for deltas based on the determined file format.

At step 320, software provider device 116 may construct an image (e.g., a software image). In some embodiments, software provider device 116 may construct the image based on the delta file received at step 316 and/or at least one delta extracted at step 318. For example, software provider device 116 may access a stored image, and may modify the stored image (or a copy of the stored image) according to the changes represented by one or more deltas of the delta file. By way of example, software provider device 116 may access an image from a controller 124c to which software provider device 116 is communicably coupled. As another example, software provider device 116 may access a local image (e.g., stored on a memory component of software provider device 116) or an image stored on a database. In some embodiments, the accessed image may represent a prior version of software, and the delta file (and/or one or more deltas) may correspond to a change to the prior version of software. In some embodiments, constructing the image may comprise constructing a serialized image of a particular format, which may be deserialized by a controller and/or controller system.

At step 322, software provider device 116 may flash the image to a device or component. For example, software provider device 116 may flash the image to one or more controllers 124 using a CAN bus, such as by using UDS. While "flash" may refer to storing the image in a flash memory, software provider device 116 may also provide the image to one or more controllers 124 in other manners, such as by storing the image in a different kind of memory component (i.e., non-flash memory), or by storing the image in a memory component separate from a controller, which the controller may be permitted to access. Additionally or alternatively, software provider device 116 may transmit the delta file and/or one or more deltas to one or more controllers 124. For example, software provider device 116 may determine that available memory space on a controller or other component in controller system 122 cannot support the full image, and may (e.g., in response to the determination) transmit a delta file or a delta instead of an image. In other embodiments, software provider device 116 may transmit an image with a delta file or a delta.

At step 324, controller system 122 may receive the image. For example, as mentioned above, software provider device 116 flashing the image at step 322 may include transmitting the image to a CAN bus of controller system 122. In some embodiments, controller system 122 may receive an image file, which may include the image as well as other code, such as metadata related to the image file, instructions, a controller identifier, or any other code for installing the image, consistent with disclosed embodiments. Additionally or alternatively, controller system 122 may receive one or more deltas, which may be received as part of a delta file, which may also include metadata, instructions, a controller identifier, a memory location identifier, or any other code for effecting the one or more deltas to a controller, consistent with disclosed embodiments.

At step 326, controller system 122 may install the image. Installing the image may be performed by one or more controllers 124 of controller system 122. In some embodiments, the image may be installed at one controller (e.g., controller 124a), or at multiple controllers (e.g., controller 124b and controller 124c). Installing an image on a controller may include deactivating another image on the controller, removing code (e.g., variables, lines of code, files, functions, etc.) from the controller, linking deltas, linking images, compressing code, and/or decompressing code (e.g., unpacking an image file). Additionally or alternatively, controller system 122 may install one or more deltas, which it may have received as part of a delta file. For example, a controller may add a delta in memory space 130, as shown in FIG. 2. In some embodiments, installing the image may comprise deserializing the image (e.g., into a data structure usable by a controller).

Figure 4:
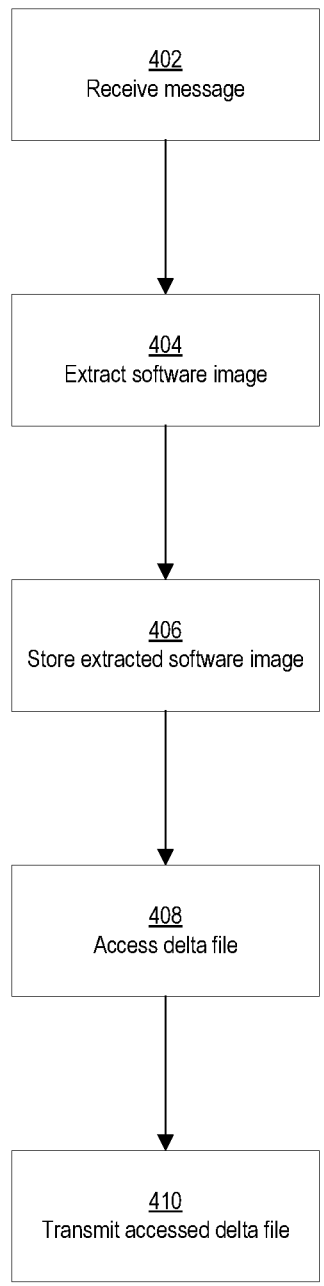
FIG. 4 is a flow diagram illustrating an exemplary controller software change process, consistent with embodiments of the present disclosure.

FIG. 4 depicts an exemplary controller software change process 400. In accordance with above embodiments, process 400 may be implemented in software change management system 108 depicted in FIG. 1, software provider device 116, any type of IoT network environment, or any combination thereof. For example, process 400 may be performed by a processor (e.g., processor 158) and/or other components of software change management system 108 (e.g., database 112), or by a computing device or IoT system. While the steps in FIG. 4 are shown in a particular order, it is appreciated that the individual steps may be reordered, omitted, and/or repeated.

At step 402, process 400 may receive a message which may be from a first remote computing device. For example, a software change management device 110 operating according to process 400 may receive a message from a controller 124, a controller system 122, a software provider device 116, or other device. In some embodiments, the message may be associated with at least one controller, which may be, for example, an electronic control unit (ECU), which may be part of an automotive controller network. In some embodiments, the received message may comprise a controller identifier. Additionally or alternatively, the message may comprise a software image, a controller system identifier, metadata, or any other software information for identifying and using (e.g., installing) a software image, consistent with disclosed embodiments.

In some embodiments, the message may be transmitted from the first remote computing device based on the first remote computing device determining that two software version identifiers are different. For example, a software provider device 116 may access a first software version identifier that is associated with a stored (e.g., archived) image (e.g., an image stored at software change management system 108, at software provider device 116, etc.), and may access a second software version identifier that is associated with an image on controller system 122. By way of example and not limitation, the first software version identifier may be associated with an image that was detected at a first controller or controller system at a first time, which may have been subsequently stored, and the second software version identifier may be associated with an image that is detected at a second controller or controller system at a second time. In some embodiments, software associated with the second software version identifier may have been deployed (e.g., to one or more controller systems 122) subsequent to software associated with the first software version identifier, such that the software associated with the second version identifier may be considered more "up-to-date." In other embodiments, software associated with the second software version identifier may have been deployed (e.g., to one or more controller systems 122) prior to software associated with the first software version identifier, such that the software associated with the first version identifier may be considered more "up-to-date." Additionally or alternatively, the message may be received as a request from the first remote computing device to change (e.g., update, rollback) software.

At step 404, process 400 may extract a software image. For example, process 400 may extract, based on the received message, an image of software associated with at least one controller. For example, process 400 may extract an image from the received message or construct an image using information included in the received message. In some embodiments, the extracted image of software may be associated with one of the software version identifiers (e.g., the first and/or second software identifier discussed above). The extracted image may be associated with a software identifier through a data structure. For example, the extracted image may be linked to a software identifier in a memory space 130 of a controller. As another example, the extracted image may be associated with a stored image (e.g., at database 112) having similar code (e.g., code effecting the same software as the extracted image), and the stored image may be linked to a software identifier (e.g., in database 112). In some embodiments, the extracted image may be a binary image, formatted image, executable image, or other type of software image.

At step 406, process 400 may store the extracted image. For example, process 400 may store the extracted image in a database (e.g., database 112), which may store multiple images. In some embodiments, the stored extracted image may be a most recently stored image of software for a controller identifier of the at least one controller (e.g., associated with the image extracted at step 404). In some embodiments, storing the extracted image in the database may comprise storing the extracted image with previously extracted images associated with the controller identifier and/or with other controller identifiers. For example, a device (e.g., one or more software provider devices 116) may extract images, which may be stored at a database and associated with various respective identifying information, a controller identifier, a controller system identifier, an extraction date, an extraction time, a device identifier (e.g., an identifier of a software provider device 116 that extracted the image, such as by using software change client 118), a version identifier, a release date, other metadata, and/or any other information that distinguishes software images from each other. By way of example, in some embodiments, the extracted image and/or the previously extracted images may be associated with respective vehicle identification numbers (VINs), vehicle models, vehicle makes, vehicle manufacture years, automobile repair facilities, etc. Of course, other non-vehicle identification information may be used as well, such as a personal computing device identifier, a commercial controller identifier, etc.

At step 408, process 400 may access a delta file. In some embodiments, the delta file may represent differences between two portions of software (e.g., two images). For example, a delta file may comprise one or more deltas, and a delta may represent a difference between two portions of software. For instance, a delta may represent differences between two contiguous lines of code in separate portions of software that are separated by lines of code that are equivalent between the two portions of software. In some embodiments, a delta file may be multidimensional. For example, a delta file may represent differences between different dimensions of software (e.g., a map file, binary code, a source attribute, etc.). As mentioned above, either additionally or alternatively, a delta file and/or delta may be position independent.

In some embodiments, process 400 may access a delta file in response to a first message (e.g., received at step 402) and/or a second message. The first and second messages may be from same or different devices and/or systems (e.g., software provider devices 116 and/or controller systems 122). The first and second messages may be received at different points in time. By way of example and without limitation, the first message may be transmitted by a software provider device 116 to software change management system 108 after the software provider device 116 establishes a connection with controller system 122 and extracts at least one image from a first controller, for which a delta file may be generated. Continuing this non-limiting example, the delta file may be accessed based on a prompt to change software on a second controller. A prompt to change software on a second controller may be included as part of a message, and may be based on one or more determinations. For example, a device (e.g., a software provider device 116, controller 124*b*) may generate a prompt to change software on a second controller in response to determining that: the second controller software is underperforming (e.g., is malfunctioning, damaged, etc.), the second controller software corresponds to a version identifier or other identifier not satisfying a reference identifier (e.g., a newest version identifier associated with a stored image), and/or a user has requested a change to the second controller software (e.g., for repair). In some embodiments, the second controller may be designated to replace a damaged, malfunctioning, underperforming, or otherwise unsatisfactory controller. For example, the second controller may be designated to replace the first controller.

In some embodiments, accessing a delta file may be based on the extracted image. For example, process 400 may access a delta file that represents differences between the extracted image of software and a stored image of software in a database. For instance, process 400 may determine a controller identifier associated with the extracted image and may determine a most recently stored image for the same controller identifier, and then may access a delta file corresponding to differences between the extracted image and the most recently stored image. Other identifiers or combinations of identifiers may also be used. Additionally or alternatively, accessing a delta file may be based on information other than an extracted image, which may be included in a message (e.g., received at step 402). For example, process 400 may determine the stored image of software based on a controller identifier included in the received message (e.g., received at step 402). The stored image of software may be a most recently stored image of software for the controller identifier and/or an image of a most recently deployed software version known to a storing system (e.g., software change management system 108).

In some embodiments, process 400 may determine that the extracted image corresponds to an already stored image, and may access a delta file corresponding to differences between the already stored image and a most recently stored image (e.g., for a same controller identifier). One image may correspond to another image if the images are determined to be identical, if the images are determined to have similar code within a threshold, if the images are associated with a common identifier or combination of common identifiers, or if the images are otherwise share a commonality. In some embodiments, accessing a delta file may include searching a database using a controller identifier or other identifier. In some embodiments, accessing a delta file may include retrieving a delta file (e.g., from a database, which may also store software images).

In some embodiments, accessing a delta file may comprise generating a delta file. For instance, process 400 may generate a delta file in response to a determination that no stored images (e.g., at database 112) correspond to the extracted image. In some embodiments, generating a delta file may include comparing the extracted image of software to a stored image of software in a database and, based on the comparison, determining differences between the extracted image of software and the stored image of software. The delta file may represent the determined differences. For example, the delta file may include a plurality of deltas, with each delta indicating a difference between the extracted image of software and the stored image of software.

In some embodiments, a device implementing process 400 (e.g., software change management device 110) may generate the delta file in real time (i.e., instantaneously or near-instantaneously). For example, process 400 may include generating the delta file as an image is extracted from a message (e.g., the image coming from a controller). Additionally, process 400 may include generating the delta file as the message is received. Performing operations in real time, such as generating a delta file, may offer enhanced speed and reliability.

At step 410, process 400 may transmit the accessed delta file to a second remote computing device. In some embodiments, the second remote computing device may be separate from the first remote computing device (from which a message may be received at step 402). In some embodiments, the transmitted delta file may be configured for a program (e.g., software change client 118) to construct an image based on the transmitted delta file. For example, the image (e.g., extracted at step 404) may be a first image, and the second computing device may include client software configured to build a second image based on the transmitted delta file. For instance, the delta file may include one or more deltas indicating differences between the first and second images, which a device (e.g., software provider device 116) may use (e.g., with the first image) to construct the second image. The second image may correspond to the first image. In some embodiments, the constructed image may be configured for being flashed over a communication bus (e.g., in a vehicle). In some embodiments, a device or system performing process 400 may also compress the delta file prior to sending it to the second computing device. In some embodiments, just as the delta file may be accessed based on a prompt to change software on a second controller, the delta file may also be transmitted based on the prompt to change software on the second controller. For example, the delta file may be transmitted in response to determining damage to a system (e.g., a system of which the second controller is a part). By receiving the accessed delta file, the second remote computing device may save bandwidth, storage space, processing resources, or other computing resources, for example by not needing to download a full software image (e.g., from a software source system 100).

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

For example, while some embodiments are discussed in a context involving electronic controller units (ECUs) and vehicles, these elements need not be present in each embodiment. While vehicle communications systems are discussed in some embodiments, other electronic systems (e.g., IoT systems) having any kind of controllers may also operate within the disclosed embodiments. Such variations are fully within the scope and spirit of the described embodiments.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer-readable medium including instructions that, when executed by at least one processor, cause the at least one processor to perform operations for efficiently providing controller data as part of a maintenance or update process, the operations comprising:
   receiving, from a first remote computing device, a message associated with at least one electronic control unit (ECU) and comprising an identifier;
   extracting, based on the received message, an image of software associated with the at least one ECU;
   generating a delta file, the generating comprising:
      determining a stored image of software using the identifier;
      comparing the extracted image of software to the stored image of software; and
      based on the comparison, determining differences between the extracted image of software and the stored image of software, the delta file representing the differences; and
   transmitting the generated delta file to a second remote computing device for updating software on the second remote computing device.

2. The non-transitory computer-readable medium of claim 1, wherein the transmitted delta file is configured for a program to construct an image based on the transmitted delta file.

3. The non-transitory computer-readable medium of claim 2, wherein the constructed image is configured for being flashed over a communication bus in a vehicle.

4. The non-transitory computer-readable medium of claim 1, wherein the message is transmitted from the first remote computing device based on the first remote computing device determining that two software version identifiers are different, the extracted image of software being associated with one of the software version identifiers.

5. The non-transitory computer-readable medium of claim 1, wherein the extracted image is a binary image.

6. The non-transitory computer-readable medium of claim 1, the operations further comprising storing the extracted image in a database.

7. The non-transitory computer-readable medium of claim 6, wherein the stored image is a most recently stored image of software for ECUs associated with the identifier.

8. The non-transitory computer-readable medium of claim 6, wherein
   storing the extracted image in the database comprises storing the extracted image with previously extracted images associated with the identifier.

9. The non-transitory computer-readable medium of claim 1, wherein the extracted image and the previously extracted images are associated with respective vehicle identification numbers (VINs).

10. The non-transitory computer-readable medium of claim 1, wherein the identifier is a software version identifier.

11. The non-transitory computer-readable medium of claim 10, wherein
   the stored image of software is stored in a database.

12. The non-transitory computer-readable medium of claim 1, wherein the identifier is an ECU identifier.

13. The non-transitory computer-readable medium of claim 1, wherein the stored image of software is a most recently stored image of software for the identifier.

14. The non-transitory computer-readable medium of claim 1, the operations further comprising compressing the delta file prior to transmitting it to the second computing device.

15. The non-transitory computer-readable medium of claim 1, wherein
   the second computing device includes client software configured to build the extracted image based on the transmitted delta file.

16. The non-transitory computer-readable medium of claim 1, wherein the delta file is transmitted in response to determining damage to a system.

17. A method for efficiently providing controller data as part of a maintenance or update process, the method comprising:
   receiving, from a first remote computing device, a message associated with at least one electronic control unit (ECU) and comprising an identifier;
   extracting, based on the received message, an image of software associated with the at least one ECU;
   generating a delta file, the generating comprising:
      determining a stored image of software using the identifier;
      comparing the extracted image of software to the stored image of software; and based on the comparison, determining differences between the extracted image of software and the stored image of software, the delta file representing the differences; and transmitting the generated delta file to a second remote computing device for updating software on the second remote computing device.

\* \* \* \* \*